No. 646,854. Patented Apr. 3, 1900.
J. MacDOUGALL.
APPARATUS FOR PURIFYING WATER.
(Application filed Feb. 15, 1900.)
(No Model.) 3 Sheets—Sheet 1.

Witnesses:
T. L. McKabee
Henry C. Hazard.

Inventor:
John MacDougall by
Chas. J. Williamson his Atty

No. 646,854. Patented Apr. 3, 1900.
J. MacDOUGALL.
APPARATUS FOR PURIFYING WATER.
(Application filed Feb. 15, 1900.)
(No Model.) 3 Sheets—Sheet 3.

Witnesses:
T. L. McCabe
Henry C. Hazard

Inventor:
John MacDougall, by
Chas. Williamson, his atty.

UNITED STATES PATENT OFFICE.

JOHN MACDOUGALL, OF DETROIT, MICHIGAN.

APPARATUS FOR PURIFYING WATER.

SPECIFICATION forming part of Letters Patent No. 646,854, dated April 3, 1900.

Application filed February 15, 1900. Serial No. 5,345. (No model.)

*To all whom it may concern:*

Be it known that I, JOHN MACDOUGALL, of Detroit, in the county of Wayne, and in the State of Michigan, have invented certain new and useful Improvements in Apparatus for Purifying Water; and I do hereby declare that the following is a full, clear, and exact description thereof, reference being had to the accompanying drawings, in which—

Figure 1:
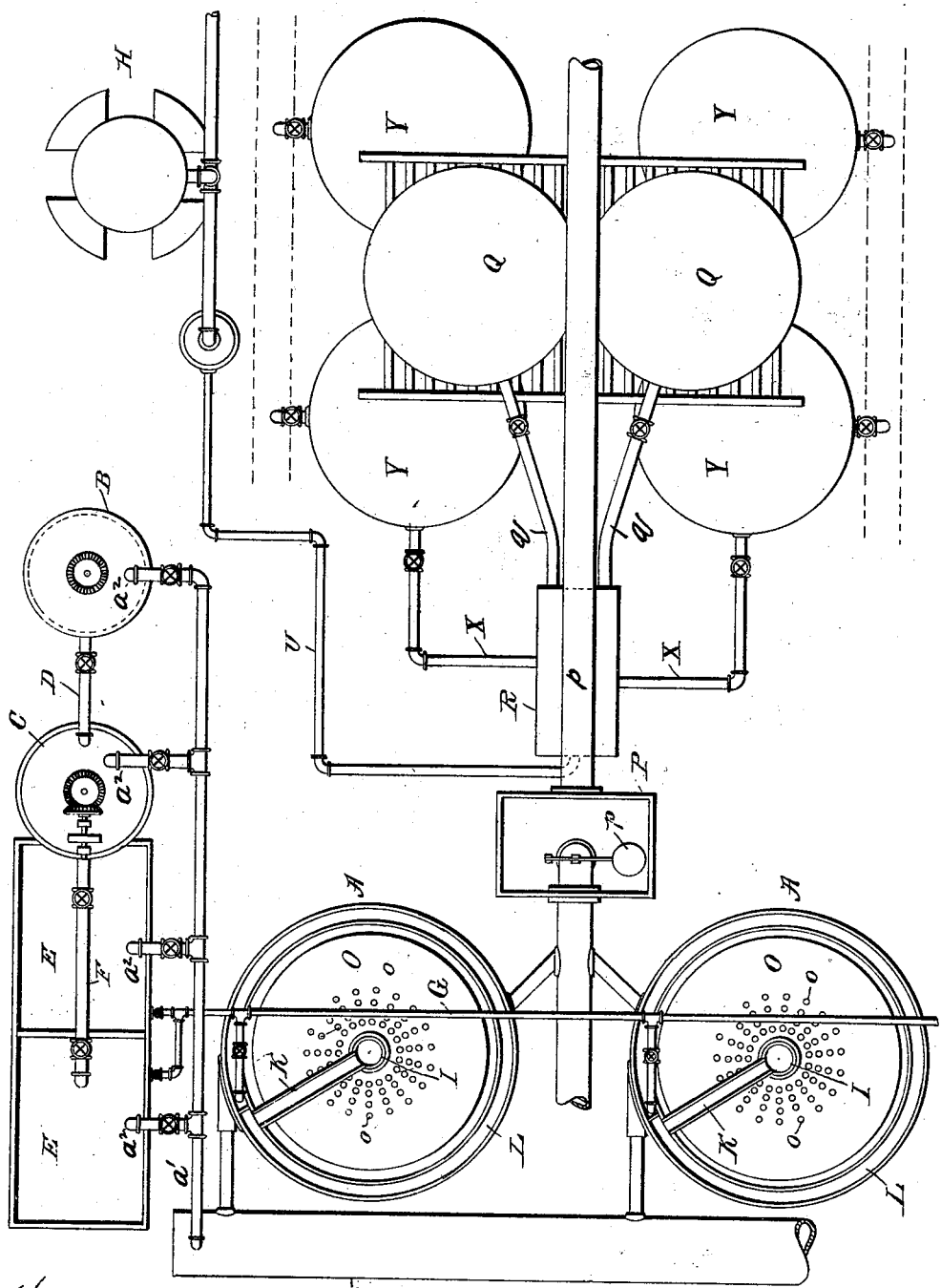
Figure 2:
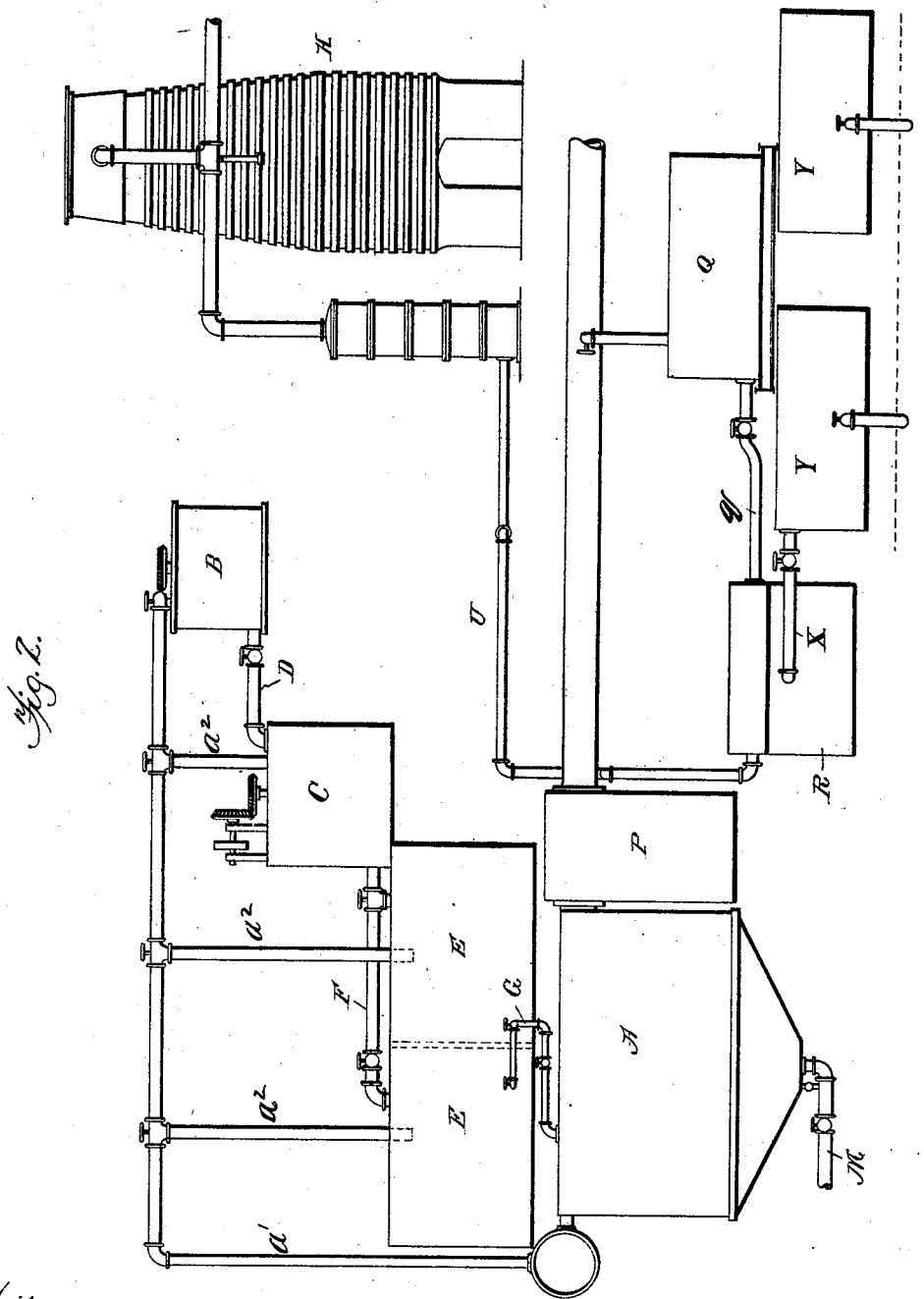
Figure 3:
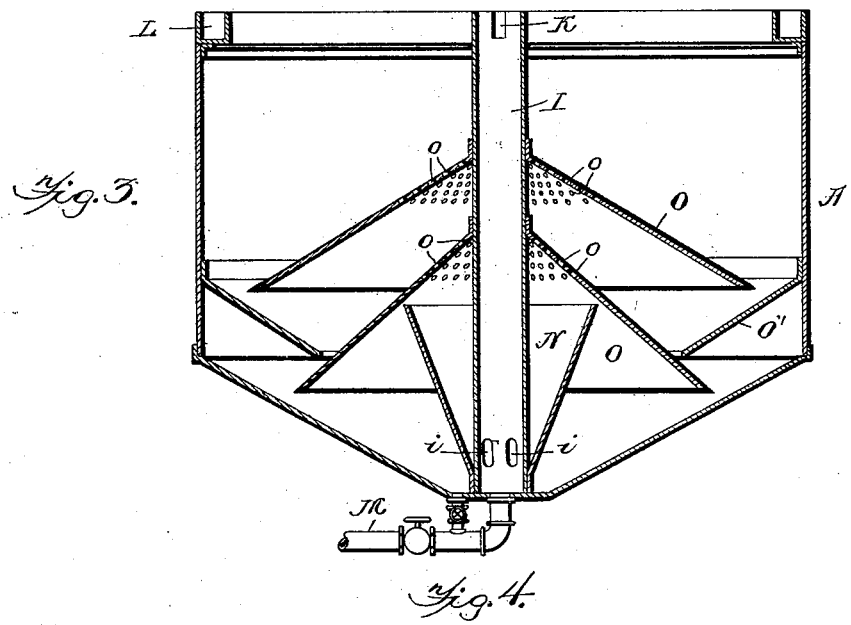
Figure 4:
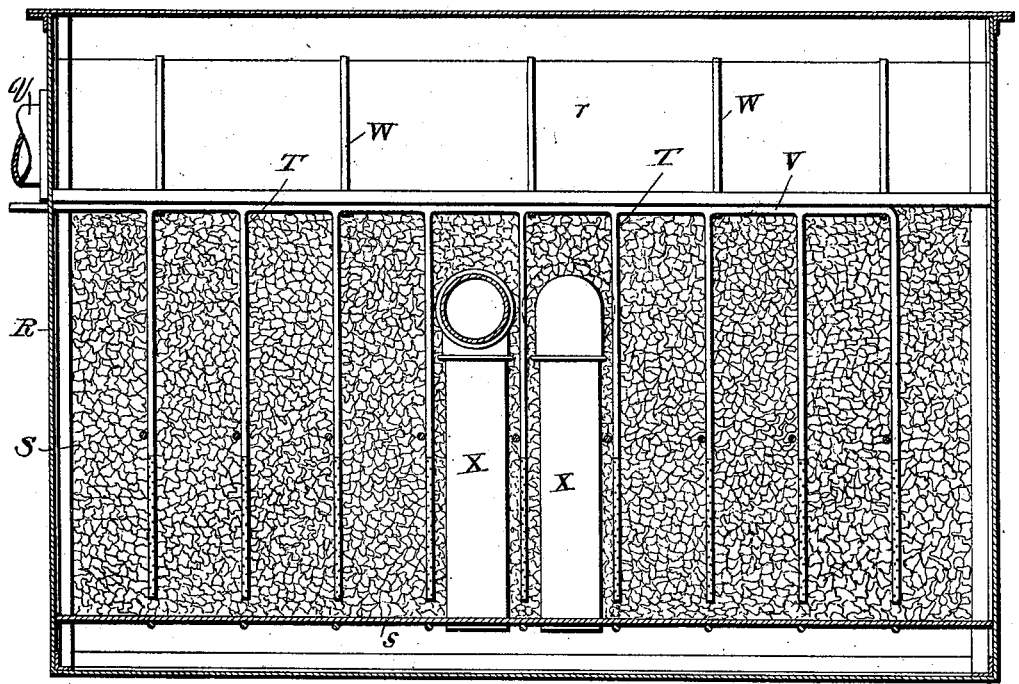
Figure 5:
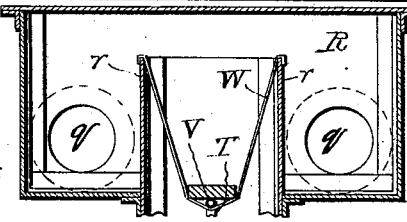

Figure 1 is a top plan view of apparatus for purifying water constructed in accordance with my invention; Fig. 2, an elevation with parts in section; Fig. 3, a vertical section of the treating-tank, and Fig. 4 a like view of the carbonator.

The object of my invention is to provide apparatus for the purification of water by which a maximum of purity shall be obtained, the treatment of the water be rapid, and the cost low; and to such end my invention consists in apparatus having the construction substantially as hereinafter specified.

My apparatus has been devised with especial reference to the treatment of water with lime, and I shall describe it in its adaptation for and use in such process, but with the premise that I do not restrict its adaptation and use to the practice of this or any other particular mode of or material for treatment.

The water to be treated is conducted from its source by a main $a$ to one or more tanks A and A, into which the treating agent—in the present instance lime—is introduced, the construction of said tanks being fully described hereinafter. The lime as delivered to the tanks is in the form of a hydrate or milk of lime and is preferably the hydrate. For the production of the latter there is a tank B for slaking caustic lime and mixing it with water, a tank C connected by a pipe D with the tank B for diluting the mixture from the latter to form milk of lime, and a tank or tanks E and E to which the milk of lime is conveyed by a pipe F and which are supplied with water, so that the hydrate is formed therein, the water and milk of lime being in such proportions as to produce a completely-saturated solution. Such water as may be required for the tanks B, C, E, and E is taken from the main $a$ by means of a pipe $a'$ and valved branches $a^2$ and $a^2$ thereof, which branches lead, respectively, to said tanks. The hydrate from the tanks E and E is conveyed to the lime-treatment tanks A and A by suitably-valved piping G. There are preferably two tanks E and E for the production of the hydrate for the tanks A and A, so that while the solution is being drawn off from one it can be in course of preparation in the other, and thus a constant supply of the hydrate provided. For the production of the caustic lime required there is a kiln H, from which by suitable means the caustic lime is carried and delivered to the slaking-tank B.

Each of the treatment-tanks A and A has preferably a cylindrical upper portion and a conical lower portion, and within it, at the center thereof, is a vertical pipe I, that at its upper end is connected by a radial channel K with a circular channel L at the top of the tank, into which the water to be treated and the hydrate are introduced and flowing around the same are conveyed into the pipe I through the channel K. By the provision of the circular channel there can be thorough commingling of the water and hydrate by the time they are delivered into the pipe I. At or near its lower end the pipe I has a number of outlet-holes $i$ and $i$ in its side leading into the tank at or near the bottom, and it communicates at its lower end with a pipe M for the purpose of discharging sediment. The pipe M is also connected with the bottom of the tank outside of the pipe I for the removal of sediment. The object of giving the lower portion of the tank a conical form is to facilitate the removal of sediment by causing it to be directed by the inclined surfaces to the removal-pipe.

Around the lower portion of the pipe I is an inverted hollow cone N, and above the latter is a hollow cone O, whose lower end is below the upper end of the inverted cone N. The upper portion of the cone O has numerous small perforations $o$ and $o$. By means of the inverted cone N the lime-treated water coming from the pipe I is directed up into the cone O, and by the latter a large volume is deflected and caused to descend and move laterally. On emerging from the cone at rim or edge it passes upward. By reason of the small perforations $o$ and $o$ small streams or currents pass through the upper part of the cone, and thus prevent the presence of a stagnant or quiescent body of water within the same, which would otherwise exist. The entire body of water is thus kept in motion. One or more cones similar to the cone O may be employed. As shown, there is one more, and there is also shown a cone O', which projects from the tank A into the space between the two cones O and O.

I introduce lime into the water under treatment in such quantity that there will be some that is free, the quantity being determined according to the absence or presence of bicarbonate of lime and the amount of other matters in suspension and in solution. In treating water containing bicarbonate of lime the quantity of lime introduced is in excess of that which will neutralize the bicarbonate. I have found that by the presence of free lime in solution there is effected the removal of impurities in the water to a degree hitherto not attained, the lime acting to break up the organic matters in solution and to agglomerate into molecular aggregates the resultants and the particles of clay and other mineral matters and humus in suspension, which by thus flocculating cause and hasten their precipitation. The materials thus affected are ordinarily hydrous-aluminum-silicate, kaolinite, and other colloids or hydrogels, whose absorptive powers are similar to those of clay. In their precipitation these agglomerated materials involve and carry down with them the bacteria and other matter in suspension.

The cone O, offering an obstacle to the flow of the water, arrests the matters in suspension, and thus facilitates and expedites their agglomeration by the above-described action of the lime and their precipitation.

No stoppage of the water in the lime-treatment tanks is necessary for sedimentation, as I have found that by my treatment the removal of impurities to the desired degree can be effected with the water constantly in motion, it being continuously supplied at the inlet and continuously discharged.

The rate of flow of water through the lime-treatment tank is regulated according to the quantity of matter in suspension and the quantity of impurities in solution.

From the lime-treatment tank the water is carried to an equalizing-tank P, into which its flow is automatically controlled, as by a float-valve $p$, to produce a constant or uniform pressure or head on the water as delivered to the filters to insure a proper and regular supply thereto. From said tank a main $p$ conducts the water to the first filters Q and Q, which by straining clarify it by the removal of suspended matters, bacteria, &c., which have not been previously eliminated. The great proportion of such matters is removed by precipitation in the lime-treatment tank; but a small percentage remains, which makes it desirable to employ the filters Q and Q.

For the purpose of removing the lime still present in the water the latter is next preferably treated with carbonic-acid gas to form carbonate of lime, although some other reagent, such as soda-ash, may be used. For treatment with carbonic-acid gas the water is passed through a carbonator comprising a carbonating-tank R, filled with coke S, and into which by numerous pipes T and T the gas from a suitable source is delivered, the coke being used as a means to insure the thorough mixture of gas with the water for combination with the lime contained therein to change it into a carbonate. The coke, being a body of broken or irregularly-formed material and so forming crooked or tortuous passages for the water, causes the latter to flow in numerous small streams through irregular or tortuous channels, whereby opportunity and condition for the thorough mixing of the water and gas are afforded. The mere discharge of the gas into the water in small jets has been found inadequate for satisfactory mixing of the water and gas, and an instrumentality, such as a body of broken material, which will act on the water and gas after the gas has emerged from the pipes or delivering-orifices is necessary for the attainment of the best results. The coke is supported upon false bottoms. I preferably utilthe carbonic-acid gas from the kiln H, and for this purpose run a pipe U from the latter to the carbonator. The pipes T and T depend from a horizontal pipe V in the carbonator near the top thereof, which is suspended by hangers W and W from partitions $r$ and $r$ in the carbonator-tank. Pipes $q$ and $q$ convey the water from the filters Q and Q to the carbonator. The water is taken from beneath the false bottom by a pipe or pipes X and X, that conduct it to second filters Y and Y to effect the removal of any hitherto-unremoved matters, such as carbonate of lime, bacteria, &c.

The reason for the application of the carbonic-acid gas to the water to remove any lime still present after the water has been passed through the first filters, and thereby completely freed from the agglomerates resulting from the action of the lime, is that it was found that when the gas was introduced into the water before its passage through the first filters and while any agglomerates were still present the gas acted to break up the agglomerates and to place the constituents thereof in such condition that they passed through the filters with the water, and thus impaired the final effluent.

It is to be understood that departures from the construction and arrangement of the parts of the apparatus herein described and shown may be made which will constitute no departure from the principle of the invention.

The construction of the lime-treatment tank illustrated and described herein is not claimed herein, as it is the subject-matter of claims in my pending application, Serial No. 716,501, filed May 12, 1899.

Having thus described my invention, what I claim is—

1. In apparatus for purifying water, the combination of a tank or receptacle, for water to be treated and a treating agent, means for separating the product of the treating agent and the water, a tank into which the water is passed after leaving such separating means, means for introducing into said last-named tank a reagent, and a body of broken material in said tank for causing the mixing of the water and such reagent, substantially as described.

2. In apparatus for purifying water, the combination of a tank or receptacle, for water to be treated and a treating agent, means for separating the product of the treating agent and the water, a tank into which the water is passed after leaving such separating means, means for introducing into said last-named tank a reagent, and a body of carbonaceous material in said tank for causing the mixing of the water and such reagent, substantially as described.

3. In apparatus for purifying water, the combination of a tank or receptacle, for water to be treated and a treating agent, means for separating the product of the treating agent and the water, a tank into which the water is passed after leaving such separating means, means for introducing into said last-named tank a reagent, and a body of coke in said tank for causing the mixing of the water and such reagent, substantially as described.

4. In apparatus for purifying water, the combination of a tank or receptacle in communication with a source of lime, and with a source of water to be treated, means for separating the water and agglomerates produced therein by the action of the lime, a tank into which the water is passed after such separation, a pipe leading from a source of supply of carbonic-acid gas into said last-named tank, a body of broken material in the tank for mixing the water and gas, and a filter to which the water is passed after leaving said tank, substantially as described.

5. In apparatus for purifying water, the combination of a tank or receptacle in communication with a source of lime, and with a source of water to be treated, means for separating the water and agglomerates produced therein by the action of the lime, a tank through which the water is passed after such separation, a pipe leading from a source of supply of carbonic-acid gas into said last-named tank, a body of material in the path of the water passing through said tank, that causes the mixing of the water and the gas, and a filter to which the water is passed after leaving said tank, substantially as described.

6. In apparatus for purifying water, the combination of a tank or receptacle for receiving the water to be treated, and a treating agent, means for separating the product of the treating agent and the water, a tank into which the water is passed after leaving such separating means, means for introducing into said last-named tank a reagent, a body of material in the path of water passing through said tank, which causes the mixing of the water and the reagent, a false bottom in the tank supporting said body of material, and a pipe or pipes in communication with the space in the tank below such false bottom, substantially as described.

In testimony that I claim the foregoing I have hereunto set my hand this 10th day of February, 1900.

JOHN MacDOUGALL.

Witnesses:
WM. A. BOTSFORD,
NATHANIEL PITCHER.